United States Patent
Yang

(10) Patent No.: US 8,066,890 B2
(45) Date of Patent: Nov. 29, 2011

(54) SPATIAL LIGHT MODULATOR WITH MULTI-LAYER LANDING STRUCTURES

(75) Inventor: Xiao Yang, Cupertino, CA (US)

(73) Assignee: Miradia Inc., Santa Clara, CA (US)

( * ) Notice: Subject to any disclaimer, the term of this patent is extended or adjusted under 35 U.S.C. 154(b) by 900 days.

(21) Appl. No.: 12/056,226

(22) Filed: Mar. 26, 2008

(65) Prior Publication Data

US 2008/0196814 A1 Aug. 21, 2008

Related U.S. Application Data

(62) Division of application No. 11/250,320, filed on Oct. 13, 2005, now Pat. No. 7,382,513.

(51) Int. Cl.
 *B44C 1/22* (2006.01)
 *B29D 11/00* (2006.01)
(52) U.S. Cl. .............. 216/2; 216/13; 216/24; 216/41; 216/67
(58) Field of Classification Search ............. 216/2, 67, 216/13, 24, 41
See application file for complete search history.

(56) References Cited

U.S. PATENT DOCUMENTS

| | | | |
|---|---|---|---|
| 5,447,600 A | 9/1995 | Webb | |
| 5,793,519 A | 8/1998 | Furlani et al. | |
| 5,885,468 A | 3/1999 | Kozlowski | |
| 5,939,171 A | 8/1999 | Biebl | |
| 6,127,756 A | 10/2000 | Iwaki et al. | |
| 6,285,490 B1 | 9/2001 | Meier et al. | |
| 6,489,241 B1 | 12/2002 | Thilderkvist et al. | |
| 6,642,913 B1 | 11/2003 | Kimura et al. | |
| 6,820,988 B2 | 11/2004 | van Drieenhuizen | |
| 6,827,866 B1 | 12/2004 | Novotny | |
| 6,856,068 B2 | 2/2005 | Miller et al. | |
| 6,891,654 B2 | 5/2005 | Kurosawa et al. | |
| 6,891,655 B2 | 5/2005 | Grebinski et al. | |
| 7,022,245 B2 | 4/2006 | Pan et al. | |
| 7,026,695 B2 | 4/2006 | Yang et al. | |
| 7,118,234 B2 | 10/2006 | Pan et al. | |
| 7,167,298 B2 | 1/2007 | Pan | |
| 7,172,921 B2 | 2/2007 | Yang et al. | |
| 7,202,989 B2 | 4/2007 | Yang | |
| 2003/0161027 A1* | 8/2003 | Kurosawa et al. | 359/290 |
| 2003/0207487 A1 | 11/2003 | Kubena et al. | |
| 2004/0000696 A1 | 1/2004 | Ma et al. | |
| 2004/0240033 A1* | 12/2004 | Pan et al. | 359/291 |

* cited by examiner

*Primary Examiner* — Shamim Ahmed
(74) *Attorney, Agent, or Firm* — Kilpatrick Townsend & Stockton LLP

(57) ABSTRACT

A method of fabricating a spatial light modulator. The method includes providing a first substrate including a first bonding surface, forming a first layer coupled to the bonding surface, wherein the first layer is characterized by a first set of material parameters, and forming a second layer coupled to the first layer, wherein the second layer is characterized by a second set of material parameters. The method also includes patterning the first layer and the second layer to form a plurality of landing structures extending to a first distance from the bonding surface of the first substrate. The method further includes providing a second substrate including a second bonding surface, joining the first bonding surface of the first substrate to the second bonding surface of the second substrate, and forming a plurality of moveable mirrors from the second substrate. During operation, the moveable mirrors make contact with the second layer.

20 Claims, 11 Drawing Sheets

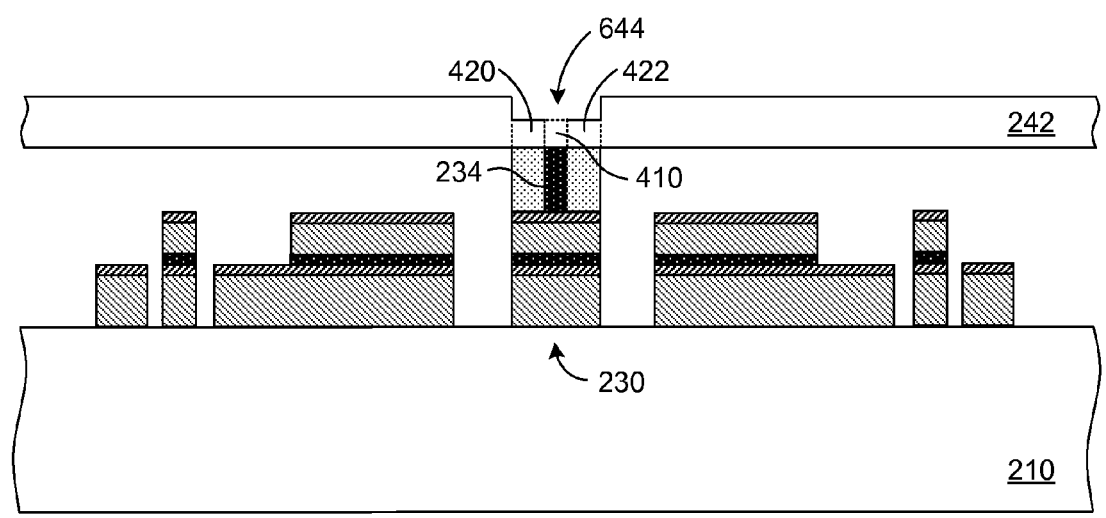
FIG. 6B
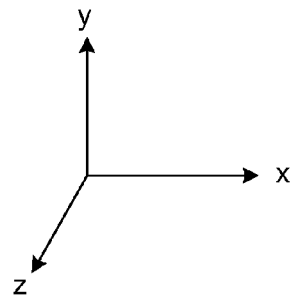

SPATIAL LIGHT MODULATOR WITH MULTI-LAYER LANDING STRUCTURES

This application is a division of U.S. patent application Ser. No. 11/250,320, now U.S. Pat. No. 7,382,513, filed on Oct. 13, 2005, the disclosure of which is hereby incorporated by reference in its entirety for all purposes.

BACKGROUND OF THE INVENTION

The present invention relates generally to semiconductor processing techniques. More particularly, the invention includes a method and structure for forming a spatial light modulator with multi-layer landing structures. Merely by way of example, the invention has been applied to a method of forming landing structures from several layers of different materials, with each material characterized by different material properties. The method and structure is applicable to spatial light modulators utilizing various mirror designs. The method and structure can be applied to other applications as well, such as actuators, sensors, detectors, and display components.

Spatial light modulators (SLMs) have numerous applications in the areas of optical information processing, projection displays, video and graphics monitors, and televisions. Reflective SLMs are devices that modulate incident light in a spatial pattern to reflect an image corresponding to an electrical or optical input. The incident light may be modulated in phase, intensity, polarization, or deflection direction. A reflective SLM is typically comprised of a one or two-dimensional array of addressable picture elements (pixels) capable of reflecting incident light. Source pixel data is first processes by an associated control circuit, then loaded into the pixel array, one frame at a time.

Some SLMs are fabricated using micro-electromechanical system (MEMS) architectures. Generally these MEMS devices include multiple components arranged in an array configuration. The components include electrodes, which are actuated to attract or repel an associated moveable mirror. Typically, the moveable mirror is attracted toward a position associated with an electrode upon application of an electrical force and restored to an original position by a restoring force. In the position associated with the electrode, some SLMs reflect light toward a viewing screen, while the SLM reflects light away from the viewing screen in the original position.

In some system architectures, landing structures, also called landing posts or landing pads, are utilized to arrest the motion of the moveable mirror in one or more of the several positions. The reliable operation of some SLM devices as a function of time are hampered by stiction forces, which can cause the moveable mirror to stick to the landing structures. Moreover, in some SLM designs, repeated contact between a moveable mirror and a landing structure results in damage to the mirror and/or the landing structure.

Therefore there is a need in the art for improved methods and structures for SLMs with landing structures.

SUMMARY OF THE INVENTION

According to the present invention semiconductor processing techniques are provided. More particularly, the invention includes a method and structure for forming a spatial light modulator with multi-layer landing structures. Merely by way of example, the invention has been applied to a method of forming landing structures from several layers of different materials, with each material characterized by different material properties. The method and structure is applicable to spatial light modulators utilizing various mirror designs. The method and structure can be applied to other applications as well, such as actuators, sensors, detectors, and display components.

In an embodiment of the present invention, a method of fabricating a spatial light modulator is provided. The method includes providing a first substrate including a first bonding surface. The method also includes forming a first layer coupled to the bonding surface. In embodiments of the present invention, the first layer is characterized by a first set of material parameters. In a particular embodiment, the first layer is a layer of aluminum. The method further includes forming a second layer coupled to the first layer. In embodiments of the present invention, the second layer is characterized by a second set of material parameters. In a particular embodiment, the second layer is a layer of titanium nitride.

The method additionally includes patterning the first layer and the second layer to form a plurality of landing structures extending to a first distance from the bonding surface of the first substrate, providing a second substrate including a second bonding surface, and joining the first bonding surface of the first substrate to the second bonding surface of the second substrate. Moreover, the method includes forming a plurality of moveable mirrors from the second substrate, wherein the moveable mirrors make contact with the second layer during operation of the spatial light modulator. In a specific embodiment according to the present invention, the plurality of moveable mirrors are coplanar with a torsion beam formed from the second substrate.

In another embodiment according to the present invention, a spatial light modulator is provided. The spatial light modulator includes an electrode substrate. The electrode substrate includes a multi-level electrode coupled to a first surface of the electrode substrate, a plurality of composite landing structures coupled to the first surface of the electrode substrate and electrically isolated from the multi-level electrode, and a spacer structure coupled to the first surface of the electrode substrate. The spatial light modulator also includes a mirror substrate bonded to spacer structure of the electrode substrate. The mirror substrate includes a mirror plate fabricated from a portion of the mirror substrate. In a specific embodiment, the mirror plate includes a reflective surface and a contact surface. The mirror substrate also includes a flexible hinge fabricated from the portion of the mirror substrate and coupled to the mirror plate. The contact surface of the mirror plate makes contact with at least one of the plurality of composite landing structures upon activation of the multi-level electrode.

According to an alternative embodiment of the present invention, an array of spatial light modulators is provided. The array includes a plurality of multi-level electrodes coupled to a first surface of a first substrate. In embodiments of the present invention, each of the plurality of multi-level electrodes is adapted to provide an electrostatic force in response to a control signal. The array also includes a plurality of multi-layer landing structures coupled to the first surface of the first substrate. Each of the multi-layer landing structures includes a first material characterized by a value of Young's modulus less than 70 GPa and a second material characterized by a value of hardness greater than 2,000 kg/mm$^2$ measured on the Knoop hardness scale. The array further includes a plurality of standoff structures coupled to the first surface of the first substrate and a plurality of mirror structures. Each of the mirror structures is coupled to at least one of the plurality of standoff structures and adapted to rotate in response to the electrostatic force.

Numerous benefits are achieved using the present invention over conventional techniques. For example, in an embodiment according to the present invention, the long term reliability of the SLM is improved. Additionally, the impact force of the mirror during landing is reduced as the first material is a soft material that absorbs mechanical energy from the mirror during mirror landing. Moreover, embodiments of the present invention provide spatial light modulators with increased resistance to scratch, wear, and tear as the second material that interfaces with the mirror provides a harder material than the first material.

Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIGS. 6A-6E are simplified schematic illustrations of an SLM at various stages of a fabrication process according to an embodiment of the present invention.

DESCRIPTION OF SPECIFIC EMBODIMENTS

According to the present invention semiconductor processing techniques are provided. More particularly, the invention includes a method and structure for forming a spatial light modulator with multi-layer landing structures. Merely by way of example, the invention has been applied to a method of forming landing structures from several layers of different materials, with each material characterized by different material properties. The method and structure is applicable to spatial light modulators utilizing various mirror designs. The method and structure can be applied to other applications as well, such as actuators, sensors, detectors, and display components.

Figure 1:
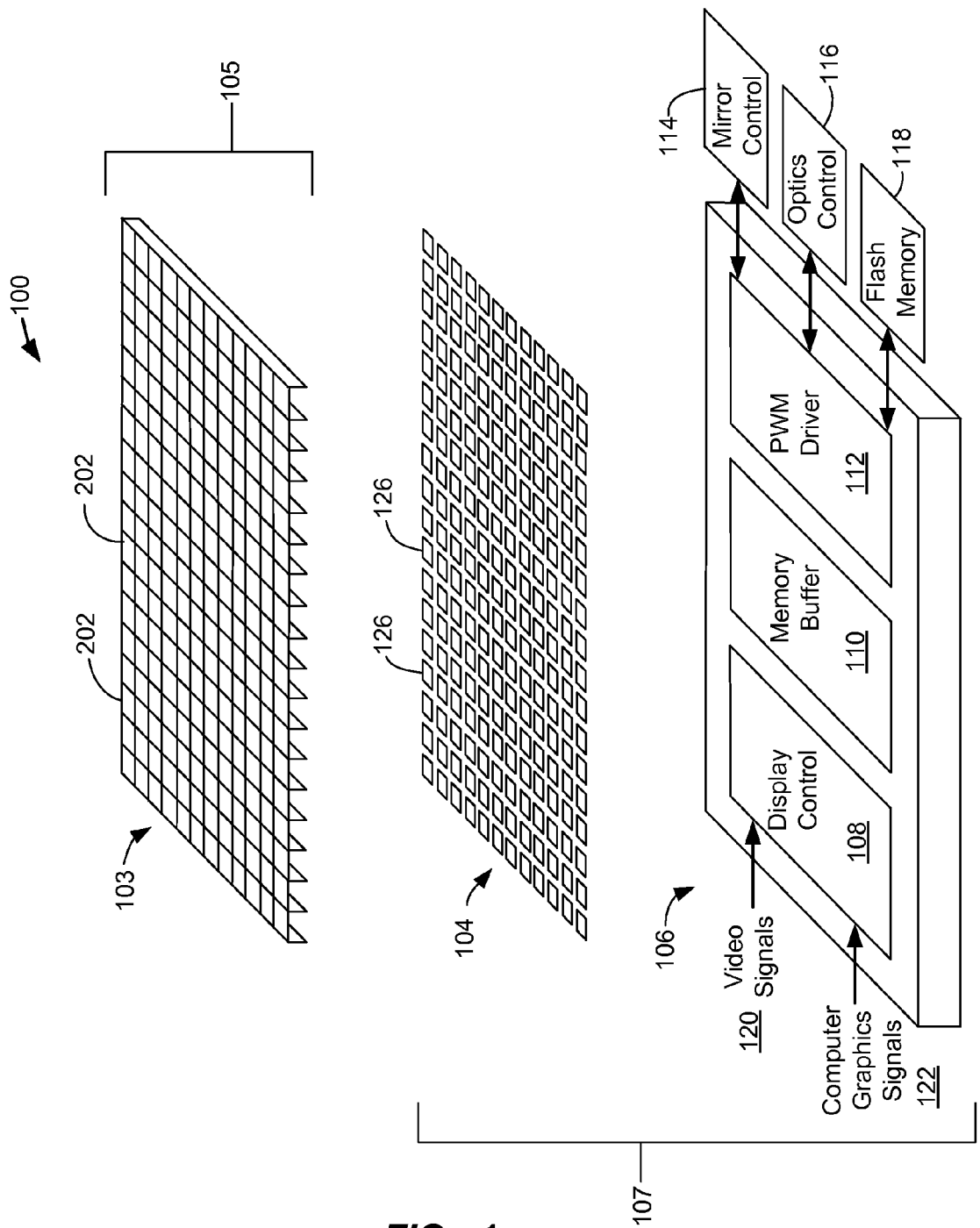
FIG. 1 is a diagram that illustrates the general architecture of a spatial light modulator (SLM) according to an embodiment of the present invention.

FIG. 1 is a diagram that illustrates the general architecture of a spatial light modulator (SLM) 100. The illustrated embodiment has three layers. The first layer is a mirror array 103 that has a plurality of deflectable micro-mirrors 202. In a preferred embodiment, the micro-mirror array 103 is fabricated from a first substrate 105 that is a single material, such as single crystal silicon. An example of one way of forming this SLM is described in U.S. patent application Ser. No. 10/756,936, filed Jan. 13, 2004; now U.S. Pat. No. 7,118,234, commonly owned and hereby incorporated by reference for all purposes.

The second layer is an electrode array 104 with a plurality of electrodes 126 for controlling the micro-mirrors 202. Each electrode 126 is associated with a micro-mirror 202 and controls the deflection of that micro-mirror 202. Addressing circuitry allows selection of a single electrode 126 for control of the particular micro-mirror 202 associated with that electrode 126.

The third layer is a layer of control circuitry 106. This control circuitry 106 has addressing circuitry, which allows the control circuitry 106 to control a voltage applied to selected electrodes 126. This allows the control circuitry 106 to control the deflections of the mirrors 202 in the mirror array 103 via the electrodes 126. Typically, the control circuitry 106 also includes a display control 108, line memory buffers 110, a pulse width modulation array 112, and inputs for video signals 120 and graphics signals 122. A microcontroller 114, optics control circuitry 116, and a flash memory 118 may be external components connected to the control circuitry 106, or may be included in the control circuitry 106 in some embodiments. In various embodiments, some of the above listed parts of the control circuitry 106 may be absent, may be on a separate substrate and connected to the control circuitry 106, or other additional components may be present as part of the control circuitry 106 or connected to the control circuitry 106.

In an embodiment according to the present invention, both the second layer 104 and the third layer 106 are fabricated using semiconductor fabrication technology on a single second substrate 107. That is, the second layer 104 is not necessarily separate and above the third layer 106. Rather, the term "layer" is an aid for conceptualizing different parts of the spatial light modulator 100. For example, in one embodiment, both the second layer 104 of electrodes is fabricated on top of the third layer of control circuitry 106, both fabricated on a single second substrate 107. That is, the electrodes 126, as well as the display control 108, line memory buffers 110, and the pulse width modulation array 112 are all fabricated on a single substrate in one embodiment. Integration of several functional components of the control circuitry 106 on the same substrate provides an advantage of improved data transfer rate over conventional spatial light modulators, which have the display control 108, line memory buffers 110, and the pulse width modulation array 112 fabricated on a separate substrate. Further, fabricating the second layer of the electrode array 104 and the third layer of the control circuitry 106 on a single substrate 107 provides the advantage of simple and cheap fabrication, and a compact final product. After the layers 103, 104, and 106 are fabricated, they are bonded together to form the SLM 100. Additional examples of methods for joining the substrates to form a bonded substrate structure are described in U.S. patent application Ser. No. 10/756,923, filed Jan. 13, 2004; now U.S. Pat. No. 7,022,245, commonly owned, and hereby incorporated by reference for all purposes.

Figure 2:
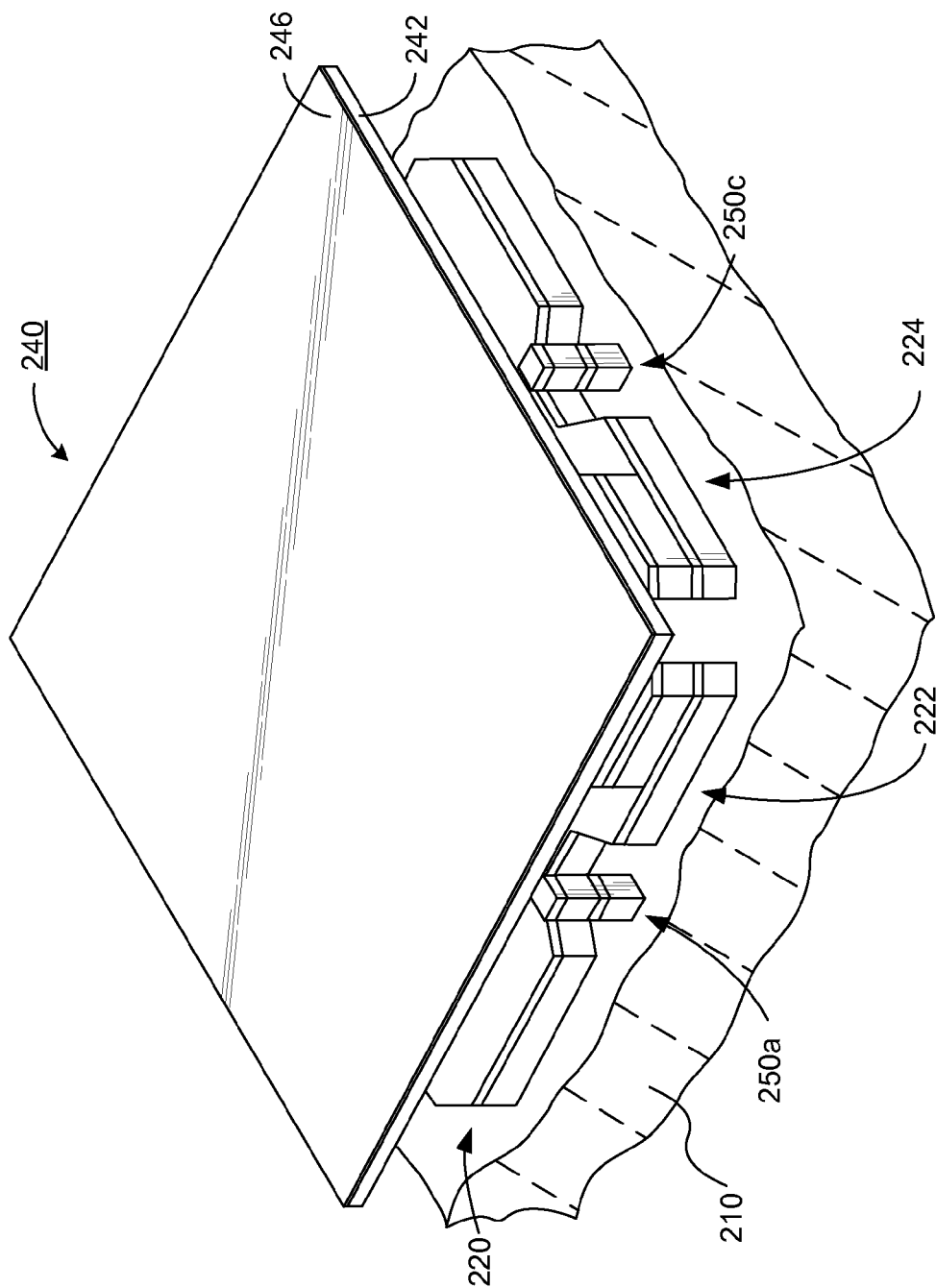
FIG. 2 is a simplified perspective view of an SLM according to another embodiment of the present invention.

FIG. 2 is a simplified perspective view of an SLM according to another embodiment of the present invention. As illustrated in FIG. 2, a first substrate 210 is provided and an electrode structure 220 is coupled to the first substrate. In an embodiment, the electrode structure includes a set of multi-level electrodes 222/224 coupled to the first surface. Additionally, a central support structure (not shown in FIG. 2, but illustrated in FIG. 3 by reference number 230), sometimes referred to as an integrated standoff structure, is coupled to the first substrate. A mirror structure 240, including a device layer 242 and a reflective layer 246 is coupled to the central support structure (not shown). In some embodiments, the device layer is fabricated from a silicon substrate, for example, a single crystal silicon wafer. Landing structures 250a and 250c are illustrated in FIG. 2. Additional details related to the structure and the fabrication of the SLM are provided throughout the present specification.

The first substrate 210 can be made of any suitable material. The suitable material generally has mechanical stability and an ability to be processed using semiconductor processing techniques. As merely an example, the material can be a semiconductor. Preferably, the first surface is made from a silicon wafer, processed according to semiconductor processing techniques. Other materials may also be used in alternative embodiments according to the present invention.

Figure 3:
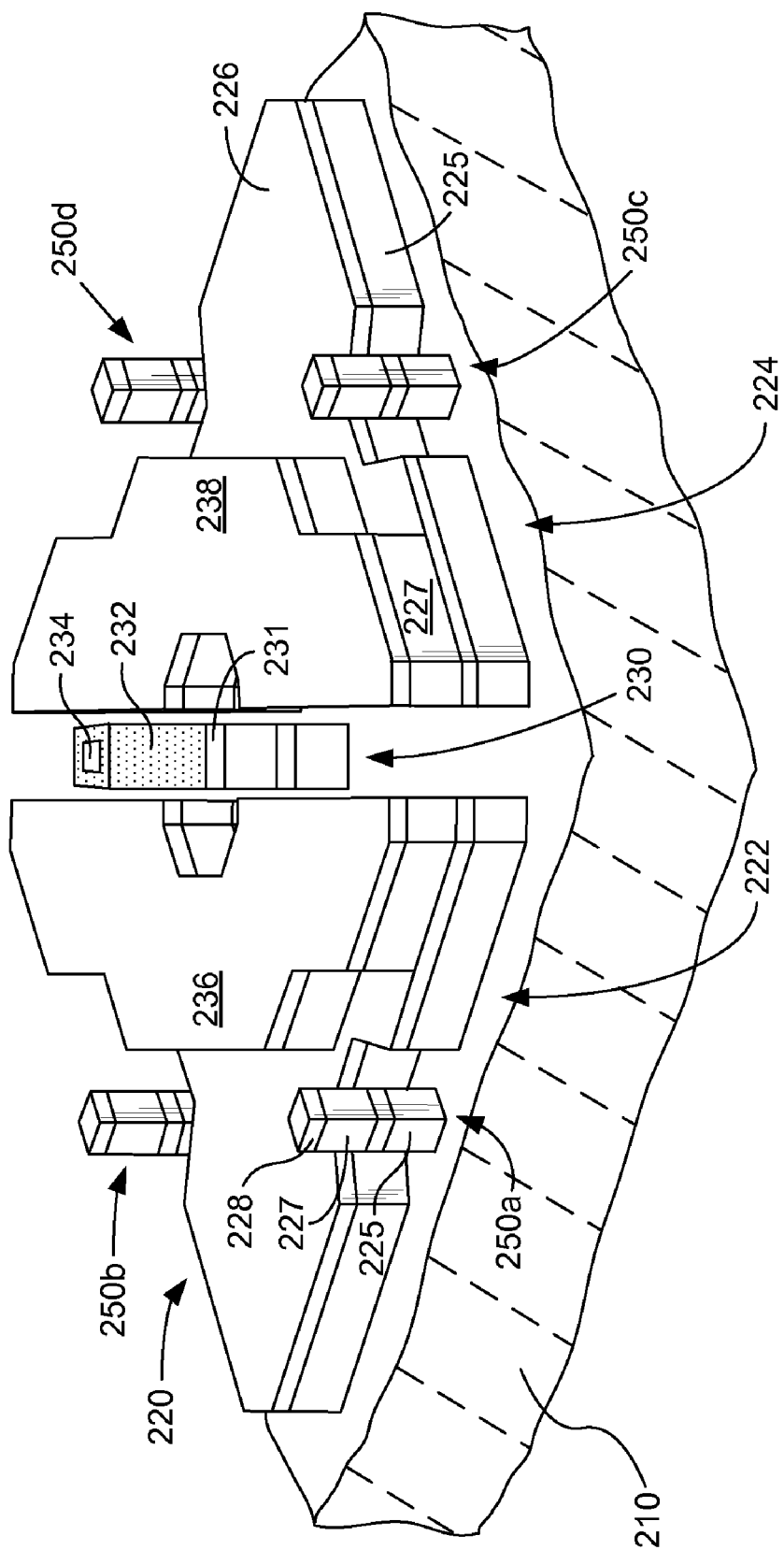
FIG. 3 is simplified perspective view of an SLM at an intermediate stage of processing according to an embodiment of the present invention.

FIG. 3 is simplified perspective view of an SLM at an intermediate stage of processing according to an embodiment of the present invention. As illustrated in FIG. 3, the SLM is shown without the mirror plate or torsion spring hinge described more fully below. Multi-level electrodes 222 and 224 and landing structures 250 are coupled to the first substrate, also referred to as an electrode substrate, and integrated standoff structure 230 is provided at a central position of the SLM. As illustrated in FIG. 3, the integrated standoff structure is fabricated utilizing several materials in a stacked configuration. As described more fully below, a lower portion of the integrated standoff structure includes aluminum, tungsten/TiN, aluminum, and TiN layers formed simultaneously with inner (raised) portions of the multi-level electrodes. In the embodiment illustrated in FIG. 3, an upper portion of the integrated standoff structure comprises an insulating layer 232, for example, silicon oxide, that is coupled to the TiN layer 231 and a via plug 234 is formed in a central portion of the insulating layer, providing electrical connectivity between the mirror layer (not shown) and the electrode substrate via the integrated standoff structure.

As illustrated in FIG. 3, the SLM architecture utilizes an integrated standoff structure 230 coupled to and supporting the mirror structure (not shown). An SLM as illustrated in FIG. 3 may be fabricated according to techniques described more fully in U.S. patent application Ser. No. 11/143,371, filed Jun. 1, 2005; now U.S. Pat. No. 7,202,989, commonly owned and incorporated by reference for all purposes.

Of course, embodiments of the present invention are not limited to an SLM ulitizing an integrated standoff structure. Merely by way of example, standoff structures in the general shape of a waffle-pack pattern, sometimes referred to as spacer support frames, and described in U.S. patent application Ser. No. 10/756,936, referenced above, are utilized according to other embodiments of the present invention. Depending on the application, an appropriate standoff structure will be selected for the SLM architecture. One of ordinary skill in the art would recognize many variations, modifications, and alternatives.

In an embodiment of the present invention, the multi-level electrodes 222 and 224 are made of materials that conduct electricity. Merely by way of example, the multi-level electrodes in the embodiment according to the present invention illustrated in FIG. 3 are made by preferentially depositing and/or patterning a group of stacked or layered metals on the first substrate. Preferably, the electrodes are made of a multilayer stack of deposited aluminum 225, a multi-layer etch stop structure 226 including layers of titanium nitride and tungsten, aluminum 227, and titanium nitride 228 layers. In alternative embodiments according to the present invention, the electrode is made of greater of lesser numbers of layers, which may include other suitable conductors. Merely by way of example, in the embodiment illustrated in FIG. 3, the electrode is a step electrode with varying electrode height as a function of lateral position. In the embodiment illustrated in FIG. 3, the step electrode includes a titanium nitride/tungsten composite layer 226, which, in some portions of the step electrode, comprises a tungsten layer sandwiched between the lower titanium nitride layer 226 and the upper aluminum layer 227. In some embodiments, the tungsten layer acts as an etch stop in a process that removes the upper layers of aluminum 227 and titanium nitride 228 from portions of the electrode structure, creating the step electrode illustrated in FIG. 3. Of course, other materials, such as oxides and/or other suitable etch stops may be utilized in other process flows.

When a voltage bias is applied between the mirror structure 240 illustrated in FIG. 2 and the electrode structure 220, the mirror plate is deflected due to electrostatic attraction. The electric field resulting from an electric potential applied to the electrode decreases as a function of distance from the electrode to the moveable member. Accordingly, the extended portions 236 and 238 of the electrodes effectively extend the height of the electrode structures 222 and 224 above that provided by the lower portions of the electrodes, thereby decreasing the distance between the electrodes and the moveable structure. As a result of this decrease in distance, the magnitude of the electric field experienced by the mirror structure is increased. In comparison with single level electrodes, in some embodiments, the voltages applied to the electrodes are reduced while still obtaining the same electric field strength at the mirror structure.

Landing structures 250 are coupled to the first substrate as illustrated in FIG. 3. In a specific embodiment, the landing structures are fabricated from the same materials and during the same fabrication processes as the multi-level electrodes. In alternative embodiment, other materials are utilized for fabricating the landing structures. A number of landing structures are provided for both the left side of the SLM (i.e., landing structures 250a and 250b) and the right side of the SLM (i.e., landing structures 250c and 250d). As described more fully below, the placement, dimensions, and orientation of the landing structures are selected to optimize system performance and achieve design goals.

Generally, the multi-level electrodes 222 and 224 as well as the multi-level landing structures 250 illustrated in FIG. 3 are fabricated simultaneously according to some embodiments of the present invention. Merely by way of example, in a particular process flow, lower sections of the landing structures and the electrodes are deposited simultaneously. In this particular process flow, upper sections of the landing structures in the electrodes are also deposited simultaneously and subsequently patterned to form the individual elements illustrated in FIG. 3. During the patterning step, inner sections of the step electrodes 222 and 224, the landing structures 250, and the integrated standoff structure 230 are masked and the outer sections of the step electrodes are removed by an etching process, terminating at the tungsten layer forming the upper surface of layer 226.

Moreover, the materials utilized in fabrication of the landing structures are selected based, in part, on their mechanical and electrical properties. In some embodiments of the present invention, the materials for the landing structures are selected to provide a predetermined elastic modulus and a predetermined hardness.

As is well known to one of skill in the art, the elastic modulus of a material, also referred to as Young's Modulus, is a constant defined as the ratio of the stress in a body to the corresponding strain. In other words, Young's Modulus is equal to the force per unit area applied to a material divided by the change in length of the material normalized by the initial length. The elastic modulus is applicable to either compressive or tensile strain and is applicable when the material is in the elastic regime, in which the material is not irreversibly deformed by the forces applied to the material.

For materials responding to stress in the elastic regime, the material may provide a shock absorbing feature in which a compressive stress of limited temporal duration results in compression of the elastic material followed by return to the original shape after removal of the compressive stress. For example, in an SLM, operation of the electrodes results in contact between the mirror plate and the landing structures. According to embodiments of the present invention, the landing structure is compressed when the mirror plate makes contact, thereby absorbing the impact of the mirror plate on the landing structure. Under compression, kinetic energy present during motion of the mirror plate is stored until the electrode is deactivated and the mirror returns to the unactivated state.

In embodiments according to the present invention, the flexibility and elasticity of the landing structure are utilized to counteract one or more parasitic forces. For example, in some embodiments, the landing structures compress a predetermined amount when the mirror structure makes contact with the landing structure. Of course, the amount of compression will depend on the particular applications and be a function of the geometry and materials present in the SLM.

Because, in some embodiments according to the present invention, the landing structures comprise a number of layered materials including an elastic material, the compression of the landing structure produces a restoring force acting in the vicinity of the landing structure. The restoring force is opposed to parasitic forces present between the landing structure and the mirror plate. Additional description of parasitic forces in the context of SLMs is provided in commonly owned and assigned U.S. patent application Ser. No. 10/718,482, filed Nov. 19, 2003; now U.S. Pat. No. 7,026,695, and incorporated herein by reference for all purposes. Upon deactivation of the electrode, the restoring force present in the landing structures will combine with other forces, including restoring torque present in the torsion spring hinge 410, to oppose the parasitic forces and return the mirror plate to the unactivated state. Preferably, the combination of the restoring force in the landing structures and restoring torque in the flexible member will be greater than the combined parasitic forces.

Figure 4:
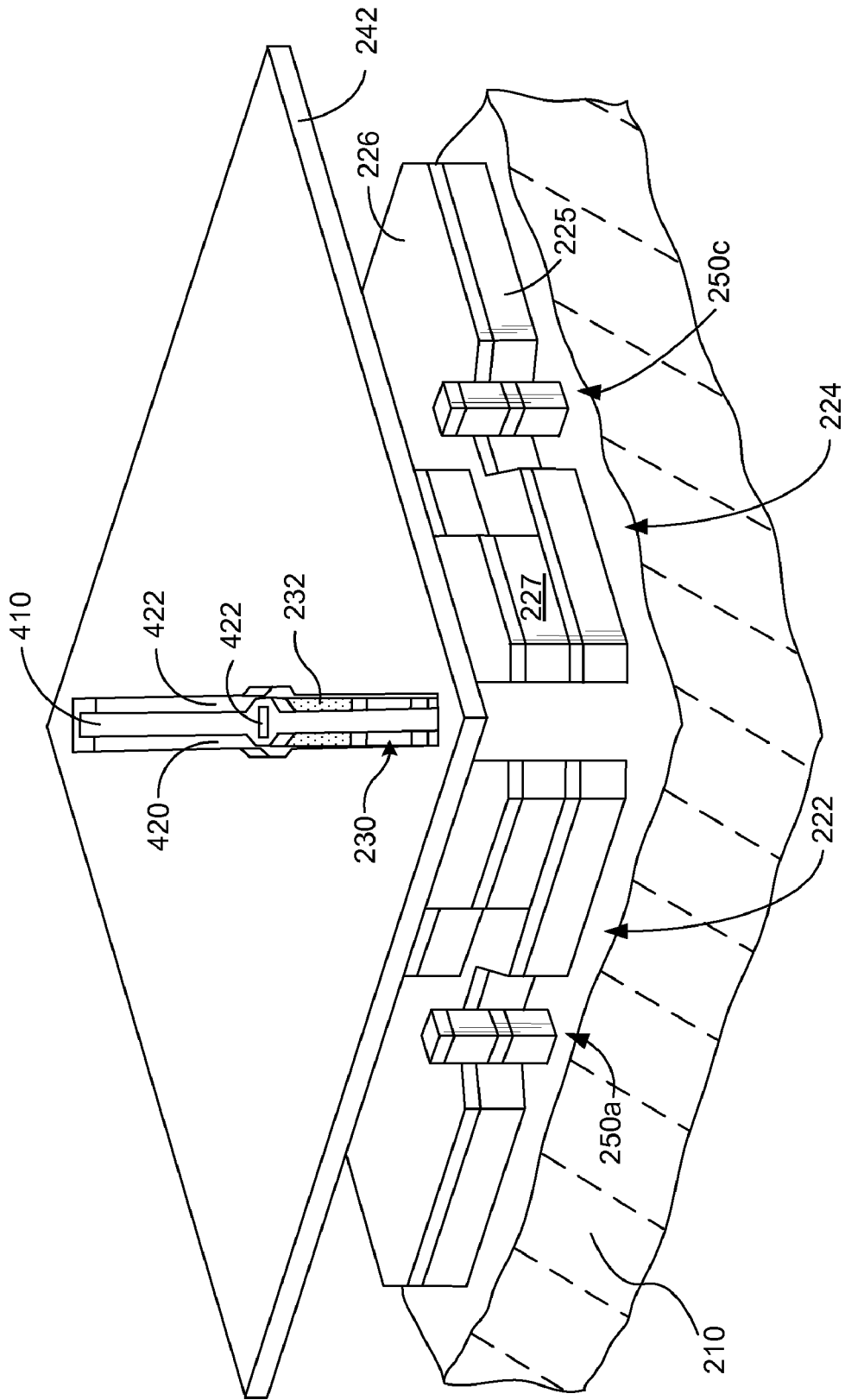
FIG. 4 is a simplified perspective view of an SLM at another intermediate stage of processing according to an embodiment of the present invention.

Moreover, the geometry of the landing is selected to provide reduced parasitic forces. For example, as illustrated in FIGS. 3 and 4, landing structures 250 are positioned with a diagonal of the landing structure aligned parallel to the torsion spring hinge 410. As a result, the mirror plate makes contact with the outer corner of the landing structures, reducing the contact area between the mirror plate and the landing structures. In alternative embodiments, the diagonal of the landing structure is aligned at an angle with respect to the torsion spring hinge, enabling contact between a side of the landing structure and the mirror plate.

In addition to a predetermined elastic modulus, some material layers of the landing structures are selected to provide a predetermined hardness. Generally, hardness is a material characteristic related to the resistance of the material to plastic deformation, usually by indentation. In an SLM, for example, the hardness of the landing structures will impact the resistance of the landing structures to permanent deformation or shape change. The greater the hardness of the material, the greater resistance it has to deformation. Embodiments of the present invention, by providing a composite landing structure utilizing different materials, separate the elastic modulus of the landing structure from the hardness, providing landing structures characterized by independent values of elastic modulus and hardness.

In the embodiment according to the present invention illustrated in FIG. 3, the portion of the landing structures that makes contact with the mirror plate (now shown) is fabricated from titanium nitride (TiN) or other suitable materials, such as tungsten. TiN is an extremely hard, thin film coating that is often applied to precision metal parts to increase durability and wear resistance. TiN generally has a hardness greater than 2,000 kg/mm$^2$ measured using the Knoop Microhardness scales. Depending on the deposition parameters, values in the range of 2500-3000 kg/mm$^2$ are typical.

In the embodiment illustrated in FIG. 3, a first portion 227 of the landing structure, fabricated from aluminum, is characterized by a low elastic modulus compared the elastic modulus of a second portion 228 of the landing structure, fabricated from TiN. Concurrently, the second portion of the landing structure is characterized by a high hardness value compared to the hardness of the first portion of landing structure. Thus, the composite landing structure illustrated in FIG. 3 provides both a reduced elastic modulus for impact absorbance and high hardness for long-term durability. Working together, these material properties an SLM characterized by long-term reliability and durability.

As will be evident to one of skill in the art, portions of the landing structure characterized by a low elastic modulus are not limited to layer 227. Referring to FIG. 3, in an embodiment according to the present invention, layer 225 is also fabricated from aluminum and provides additional impact absorbance.

Additionally, according to some embodiments, the position of the landing structures is selected to minimize stiction torques present due to the contact between the mirror structure and the landing structures when the mirrors are in an activated position. Additional details regarding reductions in stiction torques are found in commonly owned and assigned U.S. patent application Ser. No. 11/031,976, filed Jan. 7, 2005; now U.S. Pat. No. 7,142,349, which is herein incorporated by reference for all purposes. The methods and apparatus described in the above-referenced application include positioning the landing structures to reduce the distance from the torsion spring hinge to the contact points, thereby reducing stiction torques resulting from stiction at the contact points.

In an embodiment according to the present invention, two landing structures 250a and 250b are adapted to make contact with the mirror structure when the mirror structure tilts in a counter-clockwise manner. The landing structures make contact with interior portions of the mirror structure, thereby maintaining an outer portion of the mirror structure free from physical contact with the first substrate or the electrodes. In some embodiments, this design reduces a magnitude of one or more parasitic forces.

FIG. 4 is a simplified perspective view of an SLM at another intermediate stage of processing according to an embodiment of the present invention. As illustrated in FIG. 4, device layer 242 is coupled to the integrated standoff structure and supported thereby. As described more fully below with reference to FIGS. 6A-6E, torsion spring hinge 410 has been formed by recessing a central portion of the device layer and completely etching through the device layer in regions 420 and 422. Upon activation of the electrodes, the device layer is free to rotate in a clockwise or counter-clockwise direction around the longitudinal axis of the torsion spring hinge.

Figure 5:
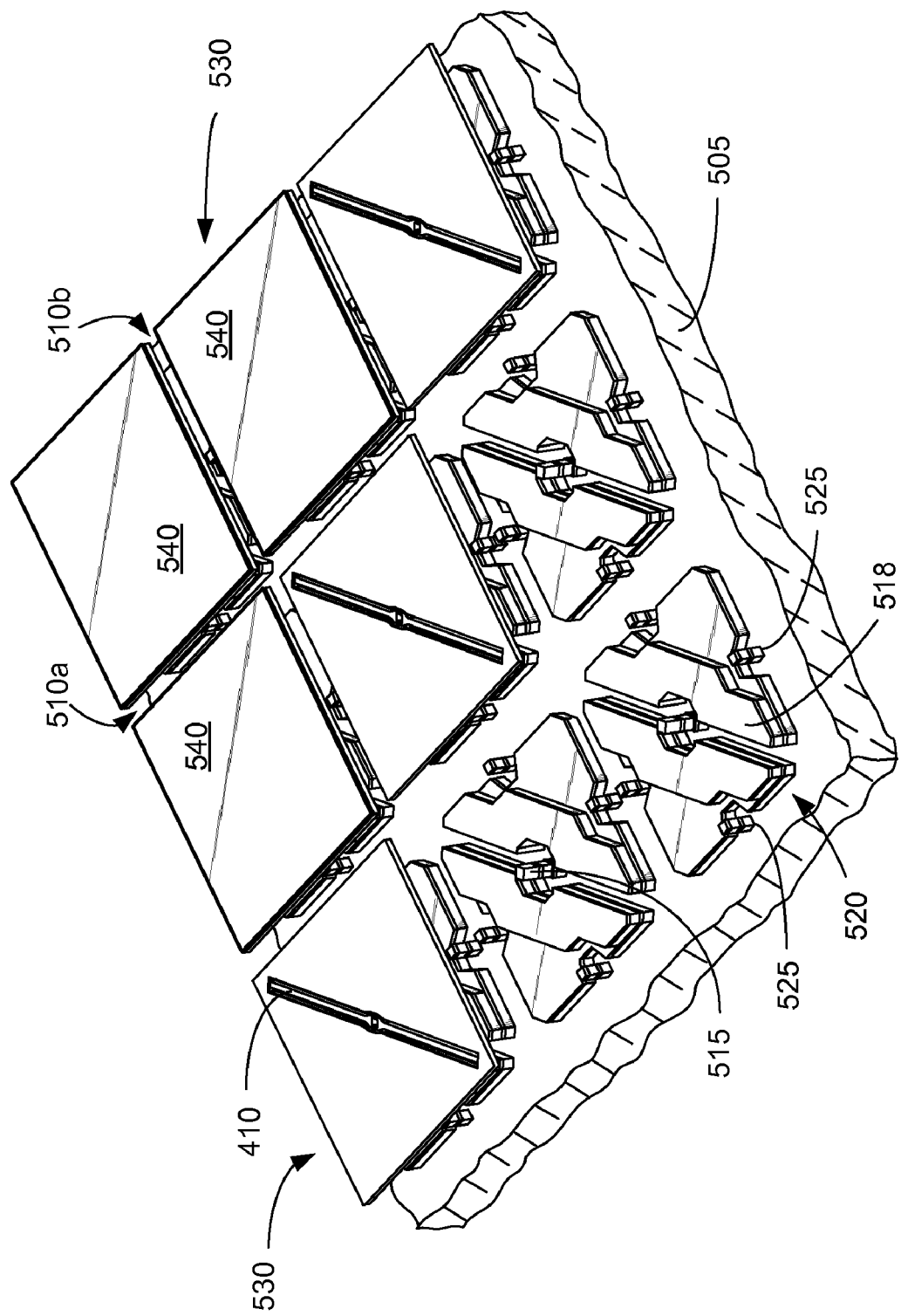
FIG. 5 is a simplified cutaway perspective view of an array of SLMs according to an embodiment of the present invention.

FIG. 5 is a simplified cutaway perspective view of an array of SLMs according to an embodiment of the present invention. As illustrated in FIG. 5, a number of micro-mirrors 540 are arranged in a spatial pattern to form a two-dimensional array. The micro-mirrors, supported by the standoff structures 515 and torsion spring hinges 410 as described above, are laterally separated by air gaps 510. For purposes of clarity, FIG. 5 provides an illustration in which portions of the spatial light modulator are omitted as a function of position to illustrate the three-dimensional nature of the spatial light modulator according to embodiments of the present invention. Multi-level electrodes 518 and landing structures 525 are illustrated as structure 520 coupled to substrate 505. Additional details regarding structure 520 are provided with reference to FIG. 3. As described with reference to FIG. 4, the SLM with attached device layer and torsion spring hinge fabricated from the device layer is represented by structure 530 in FIG. 5. Completed SLMs with a uniform reflective layer are illustrated by structures 540.

According to embodiments of the present invention, the air gaps between adjacent mirrors are formed using photolithographic processes. Therefore, the spacing between adjacent mirrors is a predetermined distance. For example, in an embodiment, the air gap 510 is 0.8 μm. In other embodiments, the air gap 510 ranges from about 0.3 μm to about 1.0 μm. Of course, the particular air gap will depend on the particular application and may not be the same on all sides of a particular micro-mirror. The fill-factor of a micro-mirror array, defined as the area of the reflective surfaces divided by the total area of the array, increases as the gap between adjacent micro-mirrors decreases. In display applications, increases in fill-factor typically result in improvement in the image quality produced by the spatial light modulator. Thus, embodiments of the present invention provide photolithographically defined spacings between mirrors and controllable fill-factors.

Figure 6A:
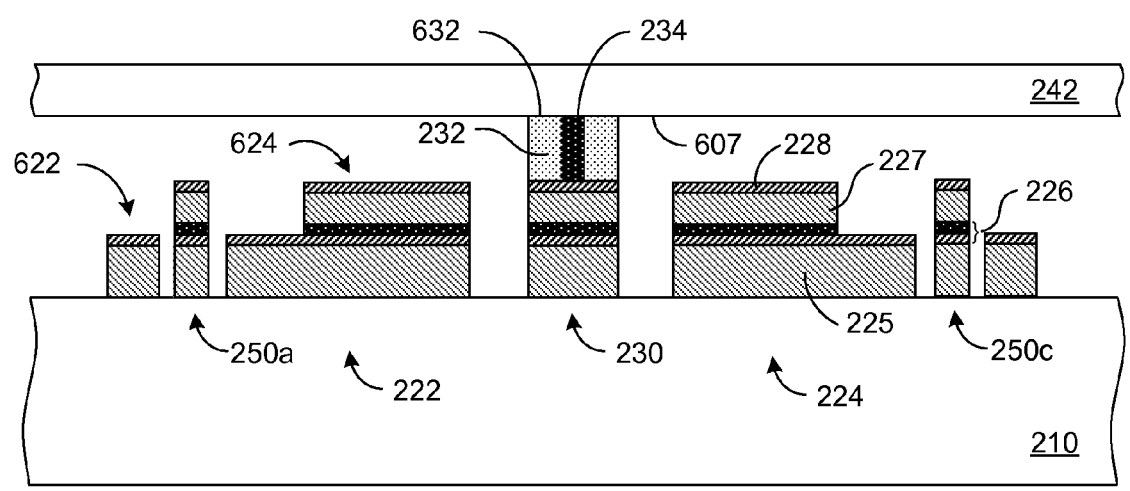

FIGS. 6A-6G are simplified schematic illustrations of an SLM at various stages of a fabrication process according to an embodiment of the present invention. As illustrated in FIG. 6A, electrodes 222 and 224 are positioned on opposite sides of integrated standoff structure 230. Referring to FIG. 2, landing structure 250a is positioned in a notched portion of electrode 222. Accordingly, in FIG. 6A, electrode 222 is represented by two portions 622 and 624. The portions are illustrated as separate in FIG. 6A for purposes of clarity, but it will be appreciated that as illustrated in FIG. 3, the portions of the electrode are not, in fact, separated. Moreover, landing structure 250b is not illustrated in FIG. 6A as it is positioned behind landing structure 250a in the cross-section presented in FIG. 6A.

Device layer 242 is coupled to the first substrate 210 by the integrated standoff structure 230. In some embodiments, spacer support frames (not shown) are utilized in place of or in combination with the integrated standoff structure. One of ordinary skill in the art would recognize many variations, modifications, and alternatives. Insulating layer 232 is illustrated in FIG. 6A and couples the device layer 242 to the integrated standoff structure 230.

Although insulating layer 232 is illustrated in FIG. 6A, the use of an insulating layer is not required by embodiments of the present invention. For example, in an embodiment, silicon structures fabricated from the device layer 242 extend to a predetermined distance from the device layer and are bonded to portions of the integrated standoff structure coupled to the first substrate. Therefore in a particular embodiment, the integrated standoff structure comprises one or more metal layers coupled to the first substrate, an insulating layer (e.g., silicon oxide) coupled to the metal layers, and a silicon structure fabricated from the device layer coupled to the insulating layer.

In some embodiments, the insulating layer 232 is formed as a portion of the device layer 242 prior to substrate bonding processes. In other embodiments, the layer 232 is deposited and patterned on substrate 210. Moreover, in alternative embodiments, combinations of insulators and silicon layers fabricated from the device layer are utilized to couple the device layer to the integrated standoff structure. Additional details regarding integrated standoff structures are provided in commonly owned and assigned U.S. patent application Ser. No. 11/028,946, filed Jan. 3, 2005; now U.S. Pat. No. 7,172,921, which is incorporated herein by reference for all purposes.

Merely by way of example, insulting layer 232 is formed in an embodiment by the deposition of a 5,000 Å layer of silicon dioxide on layers coupled to substrate 210 and subsequent patterning, but this is not required by the present invention. Other suitable materials that provide a contact region suitable for bonding of substrate 210 to another substrate are utilized in alternative embodiments. Alternative embodiments utilize deposited and patterned layers of silicon nitride, silicon oxynitride, spin-on-glass (SOG), low-k dielectrics, or the like. Moreover, insulting layer 232 may be formed by a combination of such layers.

Preferably, to form insulating layer 232, a dielectric layer is deposited by a low temperature process that preserves the integrity of the control circuitry and electrodes fabricated on substrate 210 in previous processing steps. For example, a low temperature plasma enhanced chemical vapor deposition (PECVD) process is used in one embodiment to deposit a dielectric layer covering substrate 210. Alternative embodiments employ atmospheric or low pressure chemical vapor deposition (CVD) process to form the dielectric layer. The dielectric layer may be planarized after deposition, for example, by using a chemical mechanical polishing (CMP) process to form a uniform upper dielectric surface for the layer from which a bond interface is formed. Planarization processes for dielectric layers utilized in multilevel interconnect applications are well known to one of skill in the art.

After deposition of one or more dielectric layers and optional polishing steps, a photoresist layer (not shown) is deposited on the dielectric layer or layers. The photoresist layer is utilized in patterning of the dielectric through etching or other techniques to form the insulating structure illustrated in FIG. 6A. As illustrated in FIG. 6A, the deposited dielectric layer utilized to form the insulating structure 232 is removed from all portions of the substrate 210 other than where the structures 232 are present, but this is not required by the present invention. In alternative embodiments, portions of the dielectric layer remain on the substrate 210 and cover control electrodes 222 and 224 to provide passivation benefits. In embodiments in which CMP processes are utilized to planarize the deposited dielectric layer, the upper surfaces of the insulating layer 232 provide an extremely smooth surface suitable for bonding to portions of device layer 242 as described more fully below.

As illustrated in FIG. 3, a via plug 234 is formed in a central portion of insulating structure 232. As will be evident to one of skill in the art, via plug formation processes are utilized in embodiments of the present invention to form a via in the insulating structure 232 and subsequently form a via plug that is electrically connected to the TiN layer 238 as illustrated in FIG. 3. Additional details related to the formation of via plugs in SLM structures are described in commonly owned and assigned U.S. patent application Ser. No. 11/154,834, filed on Jun. 15, 2005; now U.S. Pat. No. 7,184,195, and incorporated herein by reference for all purposes.

As illustrated in FIG. 6A, substrate 210 and device layer 242 are joined to form a composite substrate structure. Alignment of the substrates prior to bonding is performed according to processes well known to one of skill in the art. In a particular embodiment, the bonding surface 632 of insulating layer 232 is polished using a chemical mechanical polishing (CMP) process to form a surface suitable for substrate bonding operations. Wafer or substrate bonding techniques are used in some embodiments to form a hermetic seal between bonding surface 632 and bonding surface 607 of device layer 242. For example, bonding may be accomplished through the use of anodic, eutectic, fusion, covalent, glass frit, and other bonding techniques. In embodiments in which insulting layer 232 and device layer 242 are silicon dioxide and silicon, respectively, room temperature covalent bonding techniques are used to form a hermetically sealed bond between the structures. Of course, one of ordinary skill in the art would recognize many variations, modifications, and alternatives.

Although not illustrated in FIG. 6A, in some embodiments, device layer 242 is initially a portion of a multi-layer substrate structure. In an embodiment, the device layer is initially part of a silicon-on-insulator (SOI) substrate and after substrate bonding, a first silicon layer (not shown) and an insulating layer (not shown) are removed, leaving device layer 242, which is generally a silicon layer. In order to thin the SOI substrate after bonding, thinning processes using chemical mechanical polishing (CMP), grinding, etch back, any combination of these, and the like are used. In one application, the buried oxide layer present in the SOI substrate provides an etch stop layer during the thinning process. In a particular embodiment, after these layer removal and/or polishing steps, the thickness of the layer 242 is 0.3 µm. Therefore, the thickness of the layer 242 is selected to optimize design constraints for the micro-mirror devices, including structural rigidity, flexibility, and amount of inertia. Moreover, as described more fully below, other portions of layer 242 are processed to form torsion spring hinges coplanar with the mirror layer. Thus, the thickness of the layer 242 is also selected to optimize design constraints for the torsion spring hinges.

FIG. 6B illustrates an SLM at another stage of a fabrication process according to an embodiment of the present invention. As illustrated in FIG. 6B, openings 420 and 422 have been made in layer 242 to form torsion spring hinges and provide an electrical contact path to the via plug 234. In some embodiments, a two-step etching process is utilized to first form a recessed region 644 and then the openings 420 and 422. Referring to FIG. 4, a perspective view of the SLM at this stage of processing is illustrated. In an embodiment, a photoresist layer is deposited on the upper surface of layer 242, patterned and used as an etch mask to etch openings 420 and 422 through layer 242. In a specific embodiment, the etch process is terminated when the upper surface of the via plug, for example a W via plug, is reached. Etch chemistry that is selective for silicon and silicon dioxide over W is well known to one of skill in the art. Referring to FIG. 4, the etch process etches completely through layer 242 in regions adjacent the torsion spring hinge 410.

As illustrated in FIGS. 4 and 6B, openings 420 and 422 are formed in layer 242. These openings define a longitudinal torsion beam with the longitudinal axis oriented perpendicular to the cross section illustrated in FIG. 6B. As illustrated in FIG. 6B, the torsion beam 410, sometimes referred to as a torsion spring hinge, couples the micro-mirrors formed during later processing to a central portion of standoff structure 230. In the embodiment illustrated in FIG. 6B, the width of the torsion spring hinge measured along a direction (the x-direction) perpendicular to the length of the hinge (the z-direction) is a predetermined distance. In one specific embodiment, the width of the torsion spring hinge is 0.18 µm. In an alternative embodiment, the width ranges from about 0.1 µm to about 0.5 µm. The thickness of the torsion beam, measured in the y-direction, is equal to the thickness of layer 242 less than thickness of the recessed region 644 removed in the first portion of the two-step etch process.

As illustrated in FIG. 6B, an anisotropic etch that produces straight side walls for features 420 and 422 is used in some embodiments, although this is not required by the present invention. In alternative embodiments, other etch processes that produce openings of sufficient size and profile are utilized. Semiconductor processing techniques suitable for enhancing the electrical contact between the conductive layers deposited on the upper surface of layer 242 in subsequent processing steps and the W layer forming the via plug are well known to one of skill in the art, including plasma treatment after formation of the contact path openings and prior to deposition of the first layer making up the conductive layers.

Figure 6C:
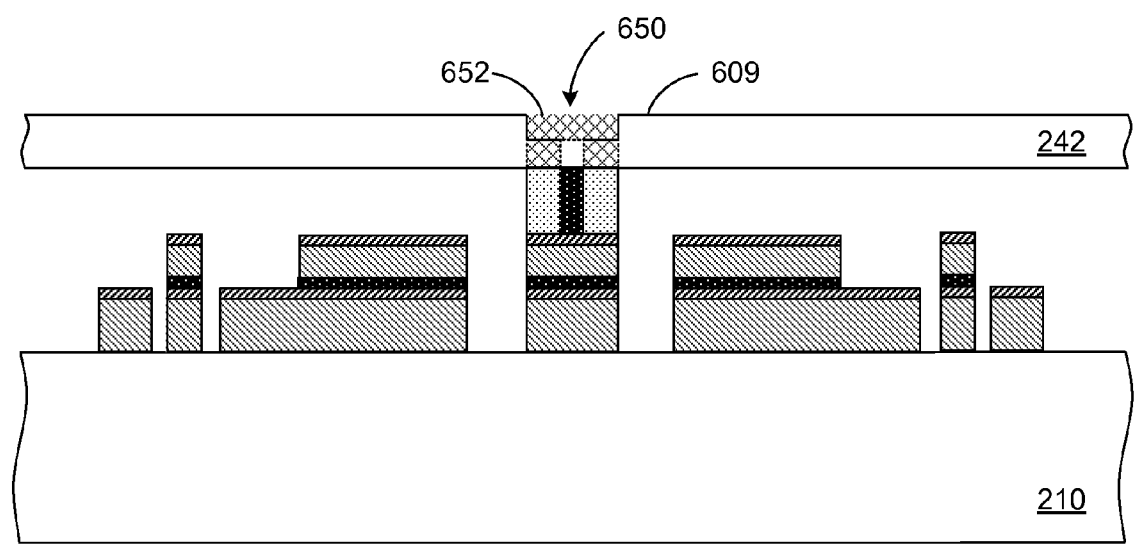

In FIG. 6C, a release layer 650 is formed on the surface of the SLM, filling the recessed region and torsion spring hinges previously formed and illustrated in FIG. 6B. As illustrated, the release layer material is present not only above the tungsten plug, filling the recessed region 644, but in openings 420 and 422 between the torsion spring hinge 410 (see FIG. 4) and the other portions of the device layer 242. In some embodiments, depending on the particular release layer materials utilized, the release layer material may flow down through these openings, making contact with the electrodes and substrate 210.

In a specific embodiment, the release layer is formed by depositing a release material, for example, photoresist, using a photoresist spin bowl as is well known to one of skill in the art. Subsequent baking and curing steps are utilized to solidify the photoresist layer. The release material is selected for mechanical strength coupled with the ability to be selectively removed by particular semiconductor processing sequences, as described more fully below. In some embodiments, the release layer 650 is defined by a varying thickness measured normal to the surface of the device layer. In regions above the recessed region, the release layer is characterized by a thickness greater than in regions above the unprocessed portions of the device layer. Accordingly, the release layer has a uniform upper surface 652 as illustrated in FIG. 6C. However, this is not required by the present invention. In alternative embodiments, the release layer has a non-uniform thickness, which may result from the particular process used to form the release layer.

As illustrated in FIG. 6C, the release layer has been planarized to align the upper surface of the release layer with surface 609 of the device layer 242. Generally, during photolithography processes, the exposure power of the light source is selected to penetrate the entire thickness of the photoresist layers present on the substrate surface. However, other photolithography processes expose less than the entire thickness. In a specific embodiment according to the present invention, the exposure energy is controlled to expose the release layer to a predetermined depth. Merely by way of example, as illustrated in FIG. 6C, the release layer is exposed to a depth aligned with the top surface 609 of the device layer. According to embodiments of the present invention, the release layer is totally removed above a plane defined by the top surface of the device layer, providing a coplanar surface as illustrated in FIG. 6C. After the planarization step illustrated in FIG. 6C, the top layer 652 provides a flat and uniform surface for future processing.

Figure 6D:
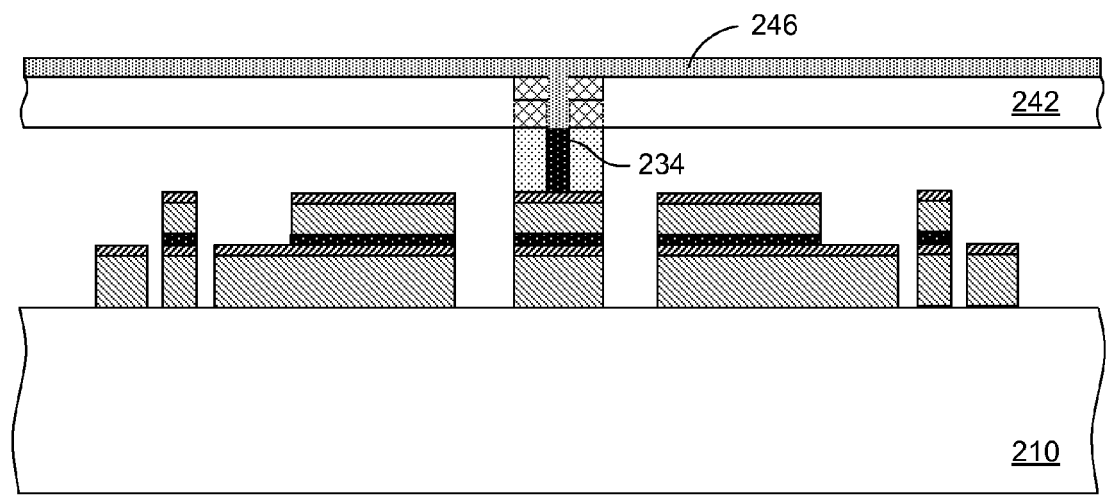

FIG. 6D illustrates a spatial light modulator at yet another stage of a fabrication process according to an embodiment of the present invention. As illustrated in the figure, at least one layer of material 246 has been deposited on the device layer 242. Referring to FIG. 4 and FIG. 6D, the layer 246 is deposited in the contact opening path 430 and electrically coupled to the via plug 234. In some embodiments of the present invention, the deposited material is able to both conduct electricity and reflect optical radiation. In a particular embodiment, the layer 246 is a multi-layer stack of metals preferentially deposited on the surface of layer 242 and in contact opening path to the via plug. Preferably, the multi-layer stack of metals is made of a deposited TiN layer and a deposited aluminum layer. For example, in a specific embodiment, the TiN layer is 150 Å thick and the aluminum layer is 300 Å thick. In alternative embodiments according to the present invention, the thickness and composition of the deposited layer or layers of material 246 is varied, utilizing other materials that conduct electricity and reflect light in the visible region of the spectrum.

As illustrated in FIG. 6D, multi-layer stack 246 provides a reflective coating on the upper surface of layer 242. As described more fully below, portions of layer 242 are processed to form micro-mirrors, which reflect light incident from above layer 242. Thus, the upper layer of stack 246 illustrated in FIG. 6D, which includes an aluminum layer, provides a high reflectivity coating for the mirror surface suitable for reflecting incident radiation in the visible region.

Moreover, since the deposited conductive material makes electrical contact with via plug 234, layer 246 provides for electrical connection between the mirrors formed in portions of layer 242 and a bias grid (not shown) coupled to electrode substrate 210. Thus, the deposited metal layers illustrated in FIG. 6D provide not only a reflective coating on the upper surface of layer 242, but also provide for an electrical connection between the mirror surface and the bias grid.

Although in some embodiments, the multiple layers forming layer 246 are distinguishable, in other embodiments, a single reflective and conductive material is used both to make contact with the via plugs and coat the surface of layer 242. Moreover, in some embodiments, the material 246 does not completely fill the contact path opening to the via plug, but still provides a continuous electrical path from the bias grid present on substrate 210 to the layer 246.

Figure 6E:
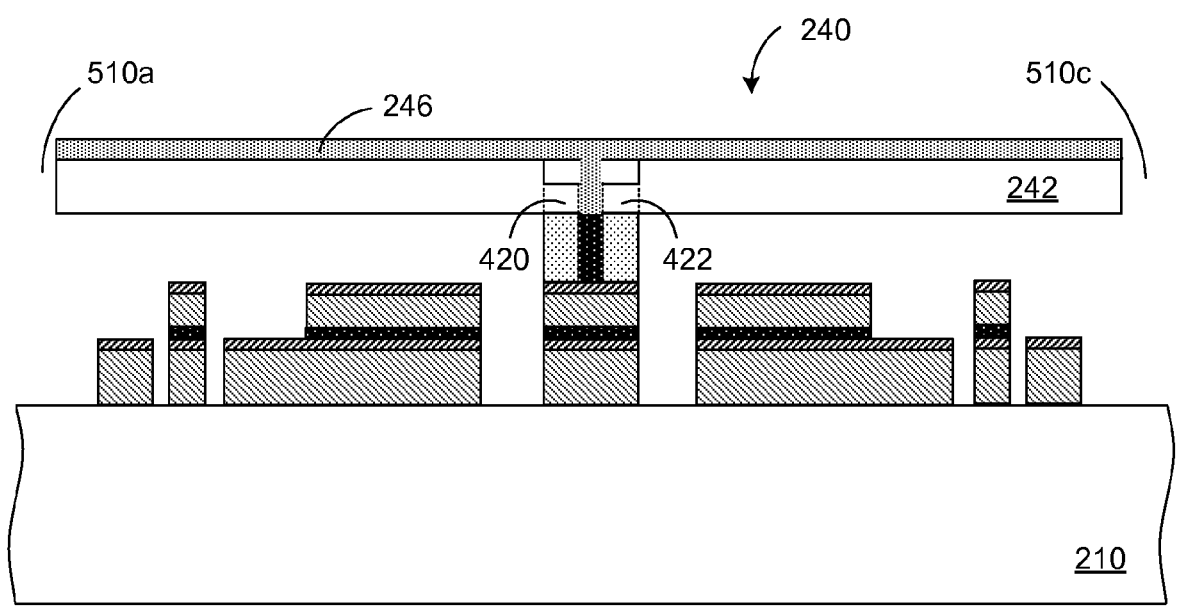

FIG. 6E illustrates a spatial light modulator at a further stage of a fabrication process according to an embodiment of the present invention. As illustrated in FIGS. 5 and 6E, layer 242 has been patterned using photolithographic processes and processed to form a number of openings 510a, 510b, 510c, and 510d, creating a number of micro-mirrors 240 coupled to torsion spring hinges. Although FIG. 6E illustrates a cross-sectional view of the mirror structures, one of ordinary skill in the art will appreciate that a three-dimensional structure is represented by the figure. Openings 510 provide for separation between adjacent micro-mirrors. As discussed in relation to FIG. 5, the fill-factor for the micro-mirror array is a function of the gap between adjacent mirrors. Because the openings 510 are defined using well developed photolithographic processes, the dimensions of the openings are generally well-controlled and may be as small as sub-micron dimensions. Additionally, openings 510 separate adjacent mirrors from each other, enabling for mirror rotation during operation.

Also illustrated in FIG. 6E is the removal of the release material formed as illustrated in FIG. 6C. The removal of the release material frees the micro-mirror 240 to rotate about torsion spring hinge 410. In an embodiment, a oxygen plasma ashing process is used to remove a release layer formed from photoresist. In this embodiment, the dry process is performed in a plasma ashing chamber for approximately six minutes. The release material surrounding the torsion spring hinges in regions 420 and 422 is removed from below the reflective layer 246 as the reactive gases are able to pass between adjacent mirrors through openings 510a and 510c, above the electrode layer, and to the hinge regions.

Figure 7:
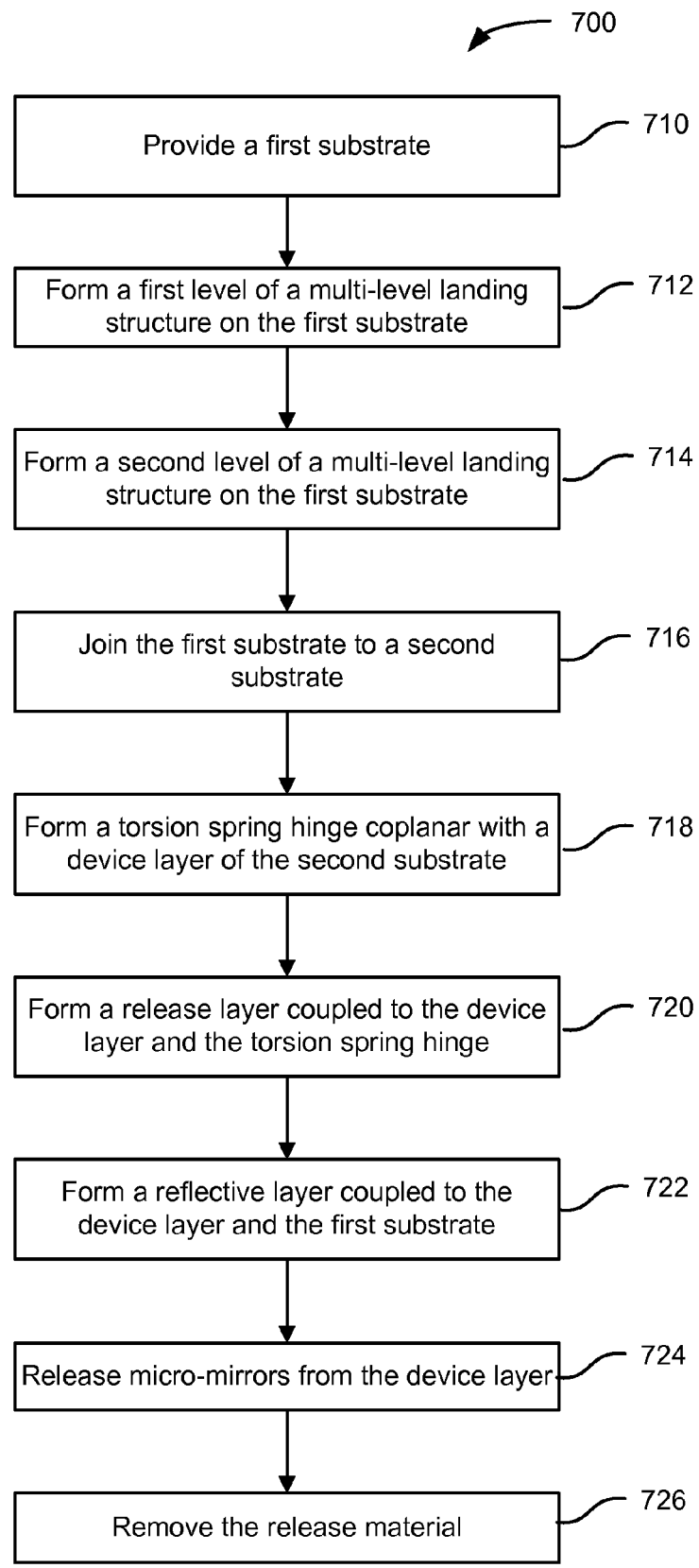
FIG. 7 is a simplified flowchart illustrating a method of fabricating an SLM according to an embodiment of the present invention.

FIG. 7 is a simplified flowchart illustrating a method of fabricating an SLM according to an embodiment of the present invention. The method (700) illustrated in FIG. 7 provides a method of the forming a multi-level landing structure with a first layer characterized by a first set of material parameters and a second layer characterized by a second set of material parameters. A first substrate is provided (710) and is generally electrode substrate. The first substrate, as illustrated in FIG. 1, provides addressing and control electronics, which are coupled to electrodes fabricated on the first substrate. As described above, activation of the electrodes results in deflection of micro-mirrors fabricated from a second substrate.

A first level of the multi-level landing structure is fabricated (712) on the first substrate. In some embodiments of the present invention, the multi-level landing structure is fabricated simultaneously with a multi-level electrode structure, sharing common layers. As illustrated in FIG. 3, the first level of the landing structure comprises a multi-layer structure, including an aluminum layer and a composite TiN/W layer. Deposition and patterning of metal layers to simultaneously form the first level of the landing structure and the first level of the multi-level electrodes is well known to one of skill in the art.

A second level of the multi-level landing structure is fabricated (714) on the first substrate. As illustrated in FIG. 3, the second level of the multi-level landing structure is coupled to an upper portion of the first level of the multi-level landing structure. In a specific embodiment, the second level of the landing structure comprises a multi-layer structure, including an aluminum layer and a titanium layer. According to embodiments of the present invention, the materials utilized to fabricate the first and second levels of the landing structure are selected based on predetermined material properties. As discussed above, in a particular embodiment, aluminum is utilized to provide a predetermined compressive elastic modulus and titanium is utilized to provide a predetermined hardness.

Moreover, according to embodiments of the present invention, the geometry of the multi-level landing structures fabricated on the first substrate is selected to reduce stiction forces present between the landing structures and a micro-mirror plate. As illustrated in FIGS. 2-4, landing structures with a rectangular cross section (in a top-view) are oriented so that the mirror plate makes contact with the corner of the rectangular structure, thereby reducing the contact area and the stiction forces.

Although not illustrated in FIG. 7, an insulating layer is deposited, patterned, and planarized to form an integrated standoff structure positioned between complementary electrodes. In some embodiments, a via plug process is utilized to form a via and a fill plug utilized to provide electrical contact between the mirror plate and a bias grid present on the first substrate. One of ordinary skill in the art would recognize many variations, modifications, and alternatives.

The first substrate is joined to a second substrate (716) utilizing a substrate bonding process. According to some embodiments of the present invention, substrate thinning operations are performed subsequent to the substrate bonding process to provide a device layer from which micro-mirrors are subsequently fabricated. A torsion spring hinge that is fabricated from and coplanar with the device layer is formed (718). Referring to FIG. 4, an upper portion of the torsion spring hinge is recessed with respect to an upper surface of the mirror plate, thereby providing sufficient clearance for mirror rotation.

A release layer is formed (720) that is coupled to the device layer and the torsion spring hinge. As discussed above, a release layer (e.g., photoresist) is utilized in some embodiments of the present invention. Preferably, an upper surface of the release layer is coplanar with an upper surface of the device layer as illustrated in FIG. 6C. A reflective layer is formed (722) that is coupled to the device layer. According to embodiments of the present invention, the reflective layer is electrically coupled to the first substrate by electrical connection passing through the integrated standoff structure.

The device layer is patterned and etched to release the micro-mirrors from the device layer (724). According to embodiments of the present invention, photolithographic processes are utilized to provide narrow gaps between adjacent micro-mirrors and corresponding high fill factors for arrays of such micro-mirrors. The release material is removed (726) to free the micro-mirrors for rotation. Typically, a plasma ashing process is utilized to remove release material in the form of photoresist.

It should be appreciated that the specific steps illustrated in FIG. 7 provide a particular processing sequence according to one embodiment of the present invention. As shown, the method uses a combination of steps including a way of forming a multi-level landing structure with selected materials characterized by predetermined material properties. Other sequence of steps may also be performed according to alternative embodiments without departing from the scope of the claims herein. Further details of the present method can be found throughout the present specification and more particularly below.

For example, alternative embodiments of the present invention may perform the processing steps outlined above in a different order. For example, the order in which the mirrors are released and the reflective layer is deposited may be varied, with these processing steps being performed in reverse order. Moreover, the individual steps illustrated by this figure may include multiple sub-steps that may be performed in various sequences as appropriate to the individual step. Furthermore, additional semiconductor processing steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of fabricating a spatial light modulator, the method comprising:
    providing a first substrate including a first bonding surface;
    forming a first layer coupled to the bonding surface, the first layer characterized by a first set of material parameters;
    forming a second layer coupled to the first layer, the second layer characterized by a second set of material parameters;
    patterning the first layer and the second layer to form a plurality of landing structures extending to a first distance from the bonding surface of the first substrate;
    providing a second substrate including a second bonding surface;
    joining the first bonding surface of the first substrate to the second bonding surface of the second substrate; and
    forming a plurality of moveable mirrors from the second substrate, wherein the moveable mirrors make contact with the second layer during operation of the spatial light modulator.

2. The method of claim 1 wherein the first layer comprises an aluminum layer.

3. The method of claim 1 wherein the second layer comprises a titanium nitride layer.

4. The method of claim 1 wherein the first set of material parameters comprises an elastic modulus less than a predetermined value.

5. The method of claim 4 wherein the predetermined value is 70 GPa.

6. The method of claim 1 wherein the second set of material parameters comprises a hardness measure less than a predetermined value.

7. The method of claim 6 wherein the predetermined value is 2,000 kg/mm$^2$ measured using the Knoop hardness test.

8. The method of claim 1 wherein the plurality of moveable mirrors are coplanar with a torsion beam formed from the second substrate.

9. A method of fabricating a spatial light modulator, the method comprising:
    providing an electrode substrate comprising a first surface;
    forming a multi-level electrode coupled to the first surface of the electrode substrate;
    forming a plurality of composite landing structures coupled to the first surface of the electrode substrate and electrically isolated from the multi-level electrode;
    forming a spacer structure coupled to the first surface of the electrode substrate;
    providing a mirror substrate;
    bonding the mirror substrate to the spacer structure of the electrode substrate;
    fabricating a mirror plate from a portion of the mirror substrate, wherein the mirror plate comprises a reflective surface and a contact surface; and
    fabricating a flexible hinge from the portion of the mirror substrate, wherein the flexible hinge is coupled to the mirror plate and the contact surface of the mirror plate makes contact with at least one of the plurality of composite landing structures upon activation of the multi-level electrode.

10. The method of claim 9 wherein the plurality of composite landing structures comprise a first layer fabricated from a first material and a second layer fabricated from a second material.

11. The method of claim 10 wherein the first material is characterized by a value of Young's modulus less than 70 GPa.

12. The method of claim 11 wherein the first material comprises aluminum.

13. The method of claim 10 wherein the second material is characterized by a value of hardness greater than 2,000 kg/mm$^2$ measured on the Knoop hardness scale.

14. The method of claim 13 wherein the second material comprises titanium nitride.

15. The method of claim 9 wherein the plurality of multi-level electrodes comprise a layered structure of aluminum, titanium nitride, tungsten, aluminum, and titanium nitride.

16. The method of claim 9 wherein the flexible hinge is a torsion spring hinge.

17. The method of claim 16 wherein a longitudinal axis of the torsion spring hinge is aligned with a diagonal of the mirror plate.

18. A method of fabricating a spatial light modulator, the method comprising:
    providing a first substrate comprising a first surface;
    forming a plurality of multi-level electrodes coupled to the first surface of the first substrate, each of the plurality of multi-level electrodes adapted to provide an electrostatic force in response to a control signal;
    forming a plurality of multi-layer landing structures coupled to the first surface of the first substrate, each of the multi-layer landing structures comprising:
    a first material characterized by a value of Young's modulus less than 70 GPa, and
    a second material characterized by a value of hardness greater than 2,000 kg/mm$^2$ measured on the Knoop hardness scale;
    forming a plurality of standoff structures coupled to the first surface of the first substrate; and
    forming a plurality of mirror structures, each of the mirror structures coupled to at least one of the plurality of standoff structures and adapted to rotate in response to the electrostatic force.

19. The method of claim 18 wherein the plurality of mirror structures comprise a mirror plate and a coplanar torsion beam.

20. The method of claim 18 wherein the first material comprises aluminum and the second material comprises titanium nitride.

* * * * *